Jan. 2, 1940.   H. J. P. SKINNER   2,185,932
MUSICAL INSTRUMENT
Filed June 21, 1939    3 Sheets-Sheet 1
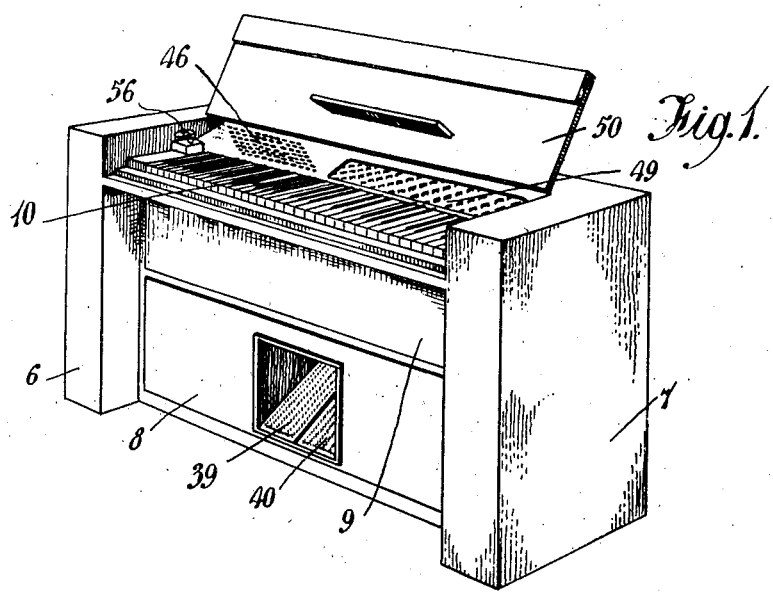
Inventor
HENRY JOHN PROWSE SKINNER,
By
Attorneys

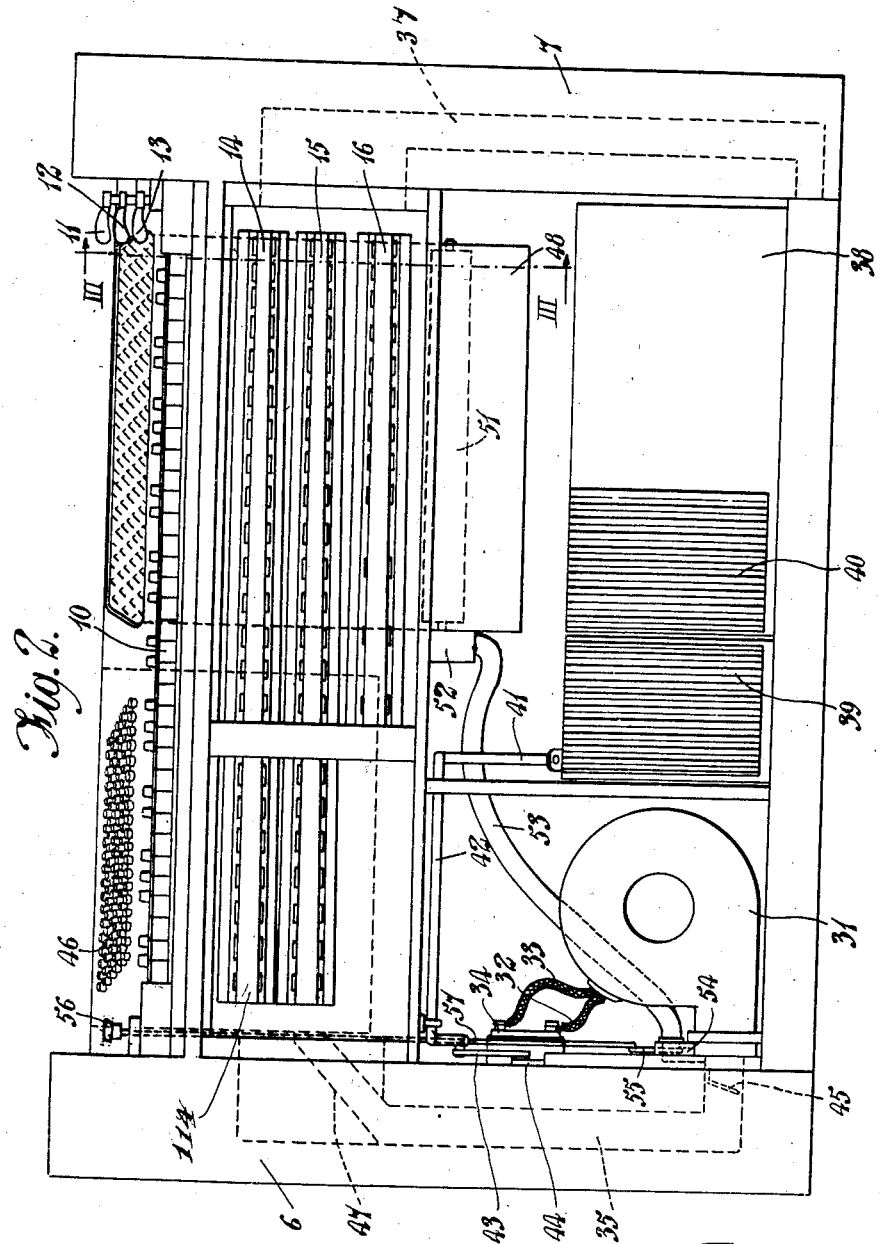

Jan. 2, 1940.  H. J. P. SKINNER  2,185,932
MUSICAL INSTRUMENT
Filed June 21, 1939  3 Sheets-Sheet 3
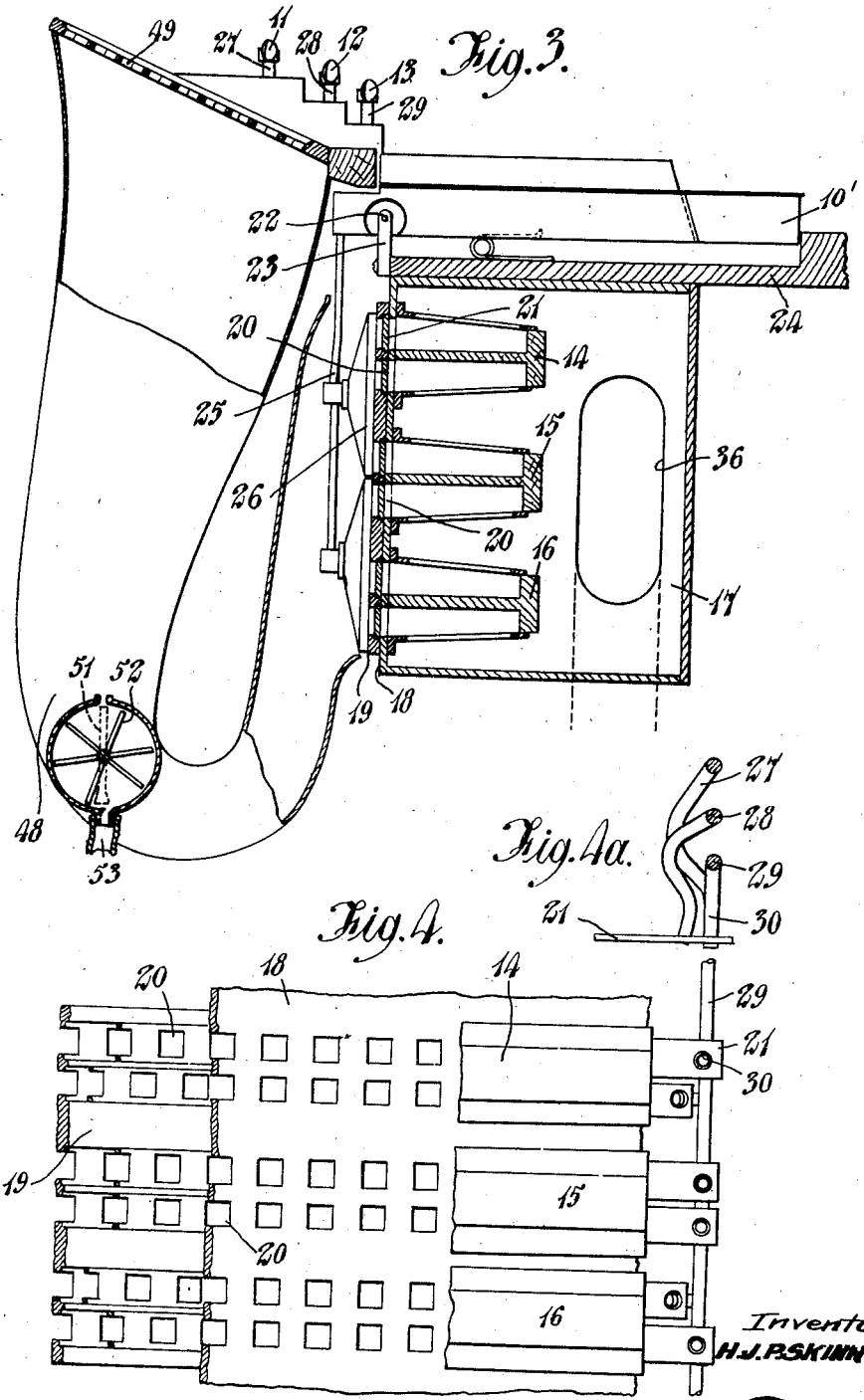

Patented Jan. 2, 1940

2,185,932

UNITED STATES PATENT OFFICE 2,185,932

MUSICAL INSTRUMENT

Henry John Prowse Skinner, London, England

Application June 21, 1939, Serial No. 280,428
In Great Britain June 13, 1938

6 Claims. (Cl. 84—355)

This invention relates to musical instruments and seeks primarily to provide a new instrument for producing, with improved tonal quality and playing technique, the sound effects of a piano-accordion or harmonium.

Broadly stated, the invention consists in providing a mechanically-blown instrument incorporating the keyboards of a piano-accordion and a piano or harmonium. Preferably, the blower will be associated with a foot control whereby the effect of the blower may be reduced when it is desired to play softly and increased for loud playing and for "attach" (i. e. momentary exaggeration of a particular note or series of notes).

In order that it may be clearly understood and more readily carried into effect, the invention is hereinafter described with reference to the accompanying diagrammatic drawings, in which:

Figure 1 is a perspective view of an instrument according to the present invention;

Figure 2 is a front elevation with the front of the casing removed to show the general lay-out of the instrument;

Figure 3 is a fragmentary section taken on the line III—III of Figure 2;

Figure 4 is a fragmentary elevation showing the piano-accordion reed banks broken away and also the slides for octave coupling;

Figure 4a is a fragmentary plan illustrating the cranking of the rods associated with the octave coupling slides;

Figure 5 is a plan view of one of the piano-accordion keys illustrating the marking thereof.

Referring now to the drawings, the instrument is provided with a casing rather like that of a small piano having two hollow end pillars 6 and 7 and removable front members 8 and 9, and within the casing there are two quite distinct parts of the instrument. The first part comprises in fact a harmonium which is actuated by means of the notes of the keyboard, indicated for example at 10, whereas the second part comprises the complete left-hand end of a piano-accordion. The keyboard controls about five octaves of reeds, the arrangement being the same as that of a small piano or harmonium, and also including such other devices as octave couplers, as is common in piano-accordion practice. The octave couplers for convenience are actuated by the hand levers 11, 12 and 13, disposed for instance at the right-hand side of the keyboard, as shown in Figure 2. The reeds are arranged in banks, as indicated at 14, 15 and 16, and in accordance with the usual practice are of the sort which are set into vibration as air is blown through them from inside the reed box 17 when appropriate notes are operated to uncover air ducts through the back of the reed box and pallet, as indicated respectively by the references 18 and 19. In Figures 3 and 4 air holes through the back of the reed box are indicated by the reference numeral 20. For octave coupling, it is convenient to open or close one or more additional air holes each associated with reeds and adapted to be opened or closed by operation of slides, as indicated for example at 21 in Figures 3 and 4. Thus, in Figures 3 and 4 where three octave coupling levers 11, 12 and 13 are provided each of the said levers operates its appropriate pair of slides.

In Figure 3 the mounting of an individual key, for instance as indicated by the note 10', has been shown in detail. The note 10' pivots about a horizontal axis 22 which is defined by two parallel upright supports 23 spaced apart the width of the note 10' and secured to the back of the base portion 24 of the keyboard structure. Extending down from the back of the note 10' is a connecting rod 25 having associated with it the pad 26; the arrangement being such that the pad 26 is lifted off the pallet 19 to uncover the air holes and render the reeds operative when the note is depressed.

The slides 21 are of course formed with apertures (not shown but which correspond to the air holes 20), the function of each slide merely being either to shut off or to leave open the appropriate air holes. The slides 21 furthermore merely move horizontally; such movement being effected by operation of the appropriate lever or levers 11, 12 or 13, associated respectively with the rods 27, 28, 29, which are appropriately cranked so as not to foul each other, the slides being connected to the rods for actuation by the loose pins 30 extending out to the slides from the cranked portions of the rods; the cranking of the rods is more clearly shown in Figure 4a.

As with all accordion and harmonium instruments, it is of course necessary to provide a supply of air under pressure for vibrating the reeds as the notes are actuated. As previously stated, the reeds in accordance with the usual practice are mounted on the back wall 18 of the reed box 17 and are vibrated as air passes through appropriate reeds on operation of the associated notes due to uncovering of the appropriate air holes 20 by the pads 26. The general arrangement of blower for delivering the necessary air is clearly shown in Figure 2. The blower 31 need be capable of delivering only quite a small output pressure and is driven by means of an electric motor supplied with current through the leads 32 and 33 extending from the terminal block 34, to which is connected a flexible lead—not shown. It is convenient to use the hollow end pillars 6 and 7 for conducting the air under pressure to the reed boxes; therefore the fan delivers air into the duct 35 of the hollow end member 6, through which it is fed to the reed box 17. From the reed box 17 the air under pressure can pass out through an opening 36 in the end wall of the reed box (which opening 36 incidentally is similar to the opening through which air passes into the reed box) into the duct 37 of the hollow end member 7; finally passing out therefrom into the bellows 38—function of which bellows will be described later.

The pedals 39 and 40 are the means for varying the volume of sound delivered from the instrument. The pedal 39 is associated through any convenient operating linkage, e. g. the members 41, 42, 43, with a slide 44 which can be operated so as to vary as required the outlet opening from the casing of the blower 31; thus, if the pedal 39 is depressed the slide 44 is opened so as in effect to increase the size of the blower outlet, and obviously therefore depression of the pedal 39 increases the volume of air delivered by the blower, and consequently also the volume of sound emanating from the instrument. In its fully-up position the pedal closes completely the blower outlet and there then can be no material pressure in the reed boxes so that to play at all the pedal 39 must at any rate be depressed slightly.

The pedal 40 is in fact provided for producing the effect of "attack." The top of the bellows chamber 38 is substantially rigid and consequently when the pedal portion 40 thereof is depressed the bellows tend to be closed up. By reason of the fact that the bellows 38 provide an enclosed deformable chamber which is, so to speak, on the end of the blower system, it will be obvious that a sudden depression of the pedal 40 will boost the pressure in the system, thereby increasing the volume of sound emanating from the instrument. In order to prevent the boost applied by depression of the pedal 40 merely from blowing back against the blower instead of raising the pressure in the reed box, a flap valve 45 is provided which is so arranged as to open immediately air is delivered from the blower, but at the same time is capable of closing to prevent blow-back when the pressure in the system is momentarily boosted by depression of the pedal 40.

On the left-hand side of the harmonium keyboard which has been indicated by the reference numeral 10, and somewhat behind that keyboard, there is provided another keyboard and associated reeds 114 substantially on the lines of the left-hand keyboard of a piano-accordion. The keys of such additional keyboard have been indicated en masse by the reference numeral 46. The keys of course comprise pressbuttons operating not merely individual notes, but also combinations of notes. The whole arrangment of the piano-accordion left-hand keyboard is exactly in accordance with the usual piano-accordion practice, with the exception that the air pressure is created mechanically by means of the blower delivering air into the piano-accordion box, which is of course closed, through the auxiliary air channel 47. Preferably, markings are provided on the piano-accordion keys 46 to indicate exactly what they are (that is to say what notes or series of notes they represent), the markings being provided in the same way as guitar or piano-accordion markings on sheet music, so that it will be possible for a person without any knowledge of music to play at least the piano-accordion part of the instrument, and possibly also filling in parts of the tune by playing on the harmonium keys of the keyboard 10. A typical marking of one of the piano-accordion left-hand keys 46 has been shown in Figure 5.

In order to amplify the sound produced by the reeds, there may be provided at the back of the pallet a horn preferably constructed for acoustic amplification and leading up to an outlet at the back of the key board or at some other convenient point and covered by a grille. Generally speaking, it is preferred to amplify only the treble half of the instrument, partly because the bass is in most cases pronounced enough in itself without further amplification, and partly because the basic melody is more often than not played with the right hand. Accordingly, therefore, the horn represented at 48 in Figures 2 and 3 is associated with the treble part only and leads up to a grille 49 disposed rearwardly of and at the right-hand end of the keyboard. The grille 49 serves to balance aesthetically the general appearance of the instrument occupying that part of the space at the back of the keyboard 10 which is not taken up by the piano-accordion keyboard. For closing over the keyboard there is provided the hinged lid 50.

In order to produce the "tremolo" effect so often employed in harmonium playing, it is convenient to provide in the horn 48 a rotatable flap 51 adapted to be rotated by the fan 52 driven by air passed thereto through the duct 53 from the air chamber 54. The air chamber 54 is of course in direct communication with the blower 31, being actually between the blower and the slide 55 controlling its outlet, which arrangement is necessary if the frequency of the tremolo effect is to be maintained constant and sustained irrespective of volume. The slide 55 controls the outlet of the air chamber 54 and so makes it possible to control the tremolo effect by raising the slide by means of the lever 56 and connecting rod 57. When the slide 55 is raised the outlet from the air chamber 54 is opened and the flap 51 rotates, whereas when the slide 55 is shut down the outlet of the air chamber 54 is closed and the flap 51 is stationary. The more the slide 55 is opened the greater is the speed of rotation of the flap 51. The flap 51 is counterweighted or is mounted somewhat eccentrically so as to ensure of its stopping always in such a position that it does not interfere with the sound passing through the horn 49 when the tremolo effect is not desired.

In some cases the blower may be of the variable output or input type so as to provide for varying degrees of loudness in playing, apart from the pedal control suggested above.

In some cases each of the slides 21 may be formed in two parts, each part being operable by levers appropriately arranged at the ends of the keyboard. Such an arrangement is of course useful where it is required to apply the octave coupling to, for instance, the treble without altering the base, or vice versa.

An instrument such as above described possesses the advantage that it can be played by a person who can play the piano but not necessarily the piano-accordion; a person who can play the piano-accordion, and also by a person with very limited musical ability. The fact that the instrument is mechanically-blown and is provided in a casing in front of which a person may sit also avoids the disadvantage of having actually to support the instrument, as well as the disadvantage of having to use quite a considerable amount of physical effort in blowing it, as in the case of a piano-accordion. Furthermore, another disadvantage which a piano-accordion has by comparison with the present instrument is that the keys are not visible in a piano-accordion and consequently a considerable amount of practice is required before it can be played at all well.

What I claim is:

1. A musical instrument including a reed box and associated reeds, a blower for supplying air to said reed box, note means for selectively controlling passage of actuating air through said reeds, and a casing for said instrument including hollow end members providing through ducts in the blower circuit.

2. A musical instrument including a reed box and associated reeds, a blower for supplying air to said reed box, note means for selectively controlling passage of actuating air through said reeds, a compressible boost chamber having its interior in communication with the interior of said reed box, and means for compressing said boost chamber to increase pressure in said reed box for "attack" effect.

3. A musical instrument including a reed box and associated reeds, a blower for supplying air to said reed box, note means for selectively controlling passage of actuating air through said reeds, a compressible boost chamber having its interior in communication with the interior of said reed box, means for compressing said boost chamber to increase pressure in said reed box for "attack" effect, and a non-return valve in the outlet of said blower for preventing blow-back to said blower on compression of the boost chamber.

4. A musical instrument including a reed box and associated reeds, a blower of variable capacity for supplying air to said reed box, note means for selectively controlling passage of actuating air through said reeds, and pedal means operating a device for varying the output delivered by the blower, said pedal means normally shutting off completely the blower output and being operable by depression for increasing the said output.

5. A musical instrument including a reed box and associated reeds, a blower for supplying air to said reed box, note means for selectively controlling the passage of actuating air through said reeds, and a horn for acoustically amplifying the sound emanating from at least certain of the said reeds.

6. A musical instrument including a reed box and associated reeds, a blower for supplying air to said reed box, note means for selectively controlling passage of actuating air through said reeds, a horn for acoustically amplifying the sound emanating from at least certain of said reeds, a tremolo flap in said horn normally providing the minimum obstruction in said horn but in rotation providing alternate periods of maximum and minimum obstruction, an air-driven rotor drivably associated with said tremolo flap and driven from said blower, and a control device for rendering operative and inoperative said rotor and said tremolo flap.

HENRY JOHN PROWSE SKINNER.